INVENTOR.
DAN W. JEFFRIES
BY Flam and Flam
ATTORNEYS.

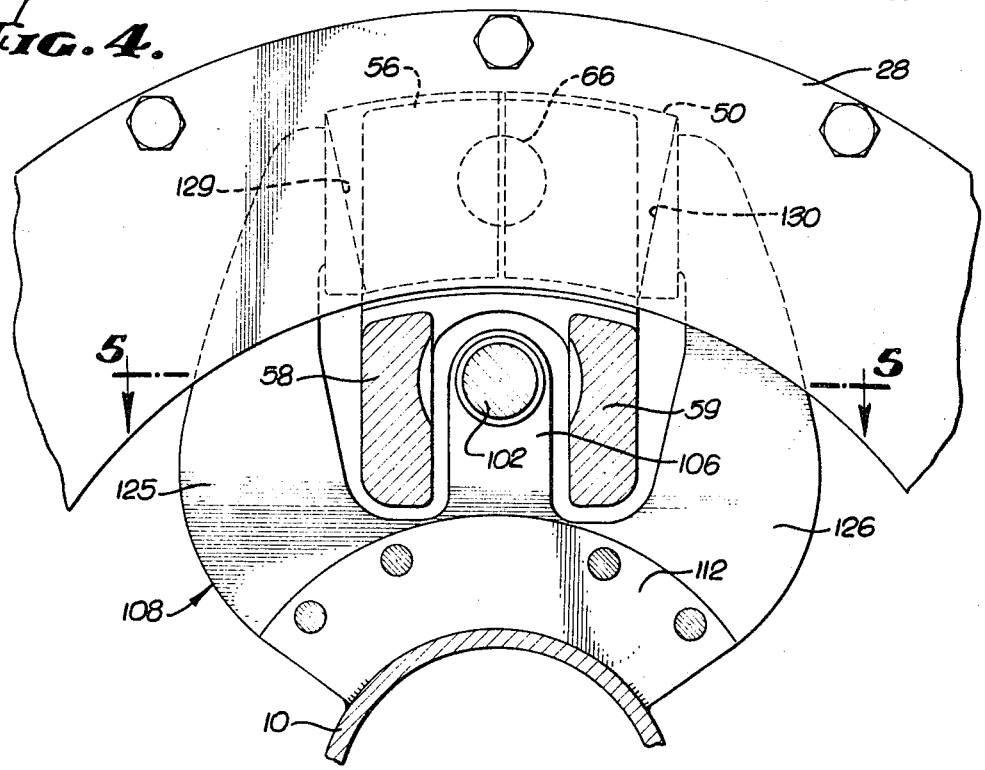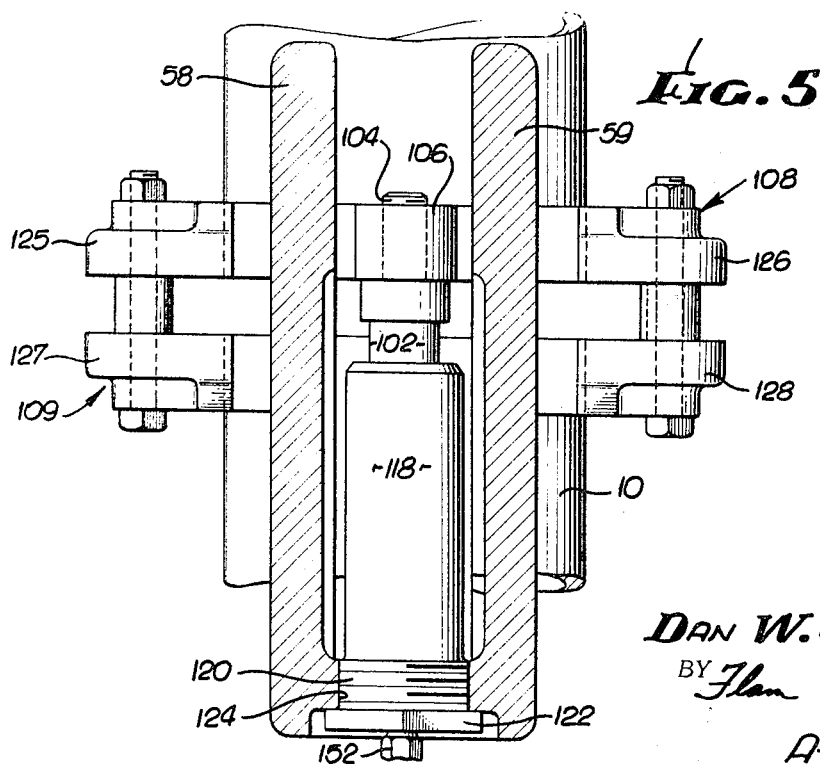

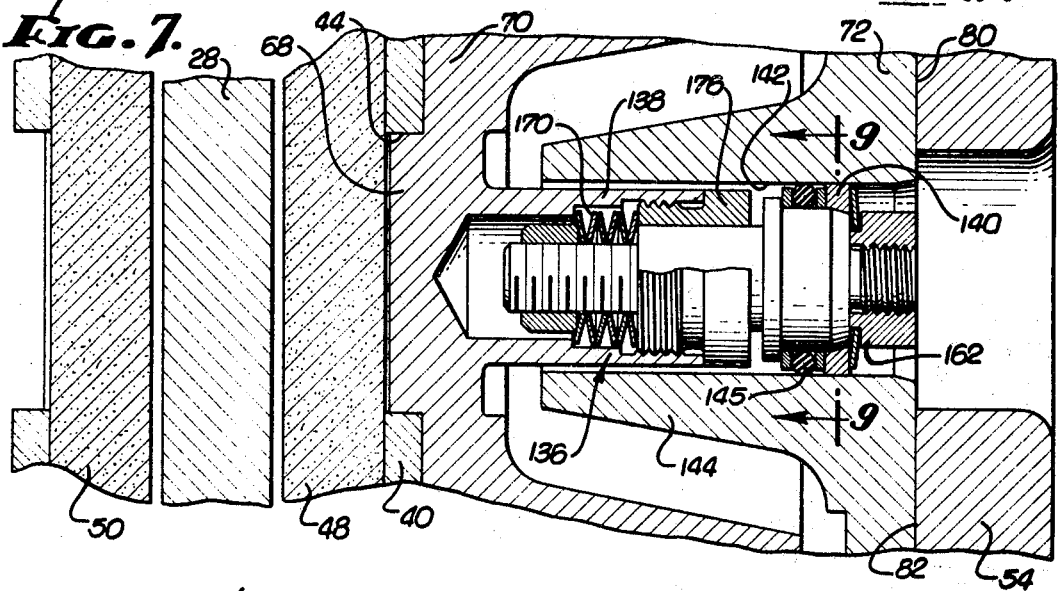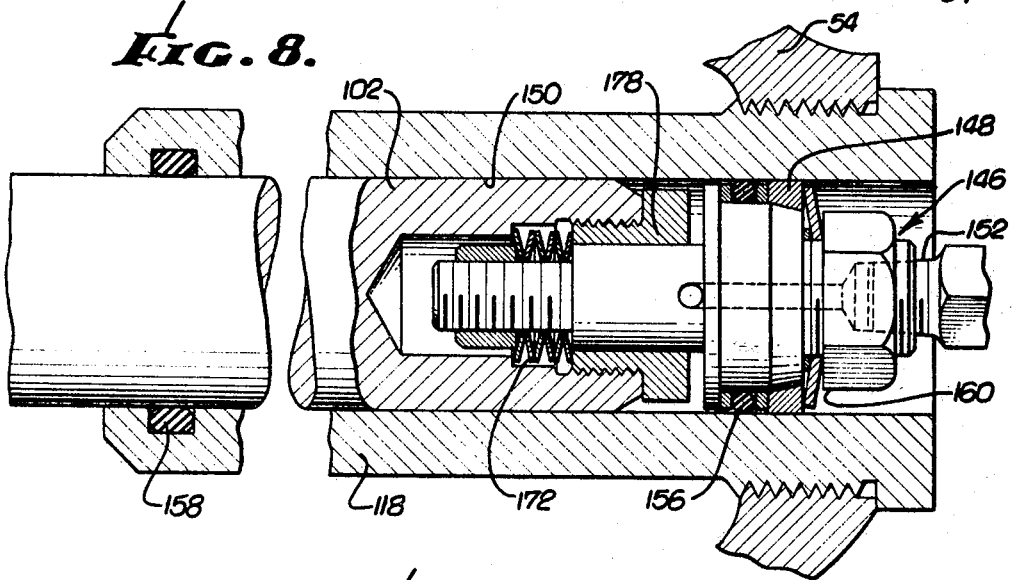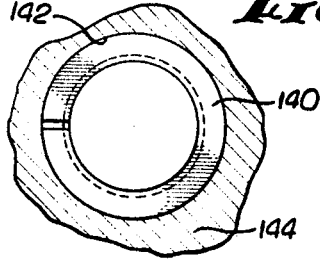

United States Patent Office 3,443,669
Patented May 13, 1969

3,443,669
COMPENSATING DISK BRAKE WITH ACTIVE AND PASSIVE CALIPER CONFIGURATION HAVING INBOARD CALIPER RETRIEVER AND INDEPENDENT TORQUE RESOLVING MEMBERS

Dan W. Jeffries, Los Angeles, Calif., assignor of one-half to Harold W. Nash, Los Angeles, Calif.
Filed Jan. 8, 1968, Ser. No. 696,410
Int. Cl. F16d 63/00, 65/14; B60t 11/10
U.S. Cl. 188—70                    21 Claims

ABSTRACT OF THE DISCLOSURE

The brake drum 20 (FIG. 1) is cooperable in a conventional manner with shoes 22. In addition, it carries a brake disk 28. The caliper 26 has ends extending on opposite sides of the disk 28. A first brake shoes 42-50 is carried by one end of the caliper. A second brake shoe 40-48 is carried on a piston 70 that works in a cylinder 72, in turn carried by the caliper. The disk 28 is clamped between the shoes upon application of fluid pressure. A compensator or retractor 136 is provided between the piston 70 and the cylinder 72. The caliper is mounted upon a post 102, in turn attached to the axle 10. The caliper is moved to cause the shoe 42-50 to engage the disk 28 upon application of fluid pressure. For this purpose, the cylinder 118 and the compensator 146 operate in conjunction with the post 102 (FIG. 8). The compensator 146 achieves the appropriate retracting movement of the caliper on brake release.

Brief summary of invention

This invention relates to compensating brake structures particularly of the disk type shown and described in my prior United States Letters Patent Nos. 3,112,014 and 3,338,354 issued Nov. 26, 1963 and Aug. 29, 1967, respectively. Particularly, this invention relates to disk brake structures having mechanisms for restoring clearance on opposite sides of the brake disk as the brakes are released. This operation may easily be achieved by providing similar compensating pistons on opposite sides of the brake disk. Such an arrangement is shown, for example, in my said '014 patent. However, providing pistons on opposite sides of a brake disk involves certain compromises resulting from the limited space available for installation of such structures. Thus in said '014 patent, the outside (outboard) pistons are located within the wheel, necessitating the removal of the internal mechanisms of the pre-existing drum brake. Vehicle suspension mechanisms prevent the disk brake from being positioned axially inwardly of the drum brake or radially outwardly on the inboard side of the wheel.

A different compromise involves using pistons only inboard of the brake disk. Thus in my '354 patent, the outside or outboard arm or anvil of a caliper merely mounts a friction lining that is pulled against the disk when the inboard piston on the opposite side is operated. This arrangement requires the caliper to float axially, or if the caliper is fixed, this requires the disk to float. In any event, the piston must retract a distance corresponding to twice the designed clearance on each opposite side with the hope (not always fulfilled) that the floating caliper will more or less center itself to establish equal clearance. This is obviously less satisfactory than the symmetrical arrangement.

The primary object of this invention is to provide a new disk brake structure in which linings on opposite sides of the brake disk are positively retracted even though no piston at all is provided on one side of the brake disk. A companion object of this invention is to provide a new improved disk brake structure in which all of the piston and cylinder parts, both fluid motor and compensator or retriever parts, are compactly located on one side for ease of access and whereby the disk brake structure may be added to an existing drum brake structure without removal of its operative parts. Another companion object is to provide a structure in which a large diameter brake disk can be located along the inside of the wheel to maximize braking torque.

In order to accomplish the foregoing objects, I provide a compensating piston for an axially floating caliper structure itself compactly located alongside the main piston, which in turn has compensating retraction means.

Another object of this invention is to provide a novel brake system whereby no initial or subsequent adjustments are required at installation to establish the required clearances. A companion object is to provide a system whereby new brake linings can be installed without special tools of any kind.

Another object of this invention is to provide a novel means for resolving the braking torque independently of the caliper structure itself. Accordingly, the caliper structure need be designed merely to sustain the clamping force.

This invention possesses many other advantages and has other objects which may be made more clearly apparent from a consideration of one embodiment of the invention. For this purpose, there is shown a form in the drawings accompanying and forming a part of the present specification, and which drawings are true scale. This form will now be described in detail, illustrating the general principles of the invention; but it is to be understood that this detailed description is not to be taken in a limiting sense.

Brief description of the drawings

FIG. 4 is a sectional view taken along the plane corresponding to line 4—4 of FIG. 3.

FIG. 5 is a sectional view taken along the plane corresponding to line 5—5 of FIG. 4.

FIG. 7 is an enlarged fragmentary view showing a portion of the apparatus in FIG. 6.

FIG. 8 is an enlarged fragmentary sectional view taken along the plane corresponding to line 8—8 of FIG. 6.

FIG. 9 is a fragmentary sectional view taken along the plane corresponding to line 9—9 of FIG. 7.

Detailed description

Figure 1:
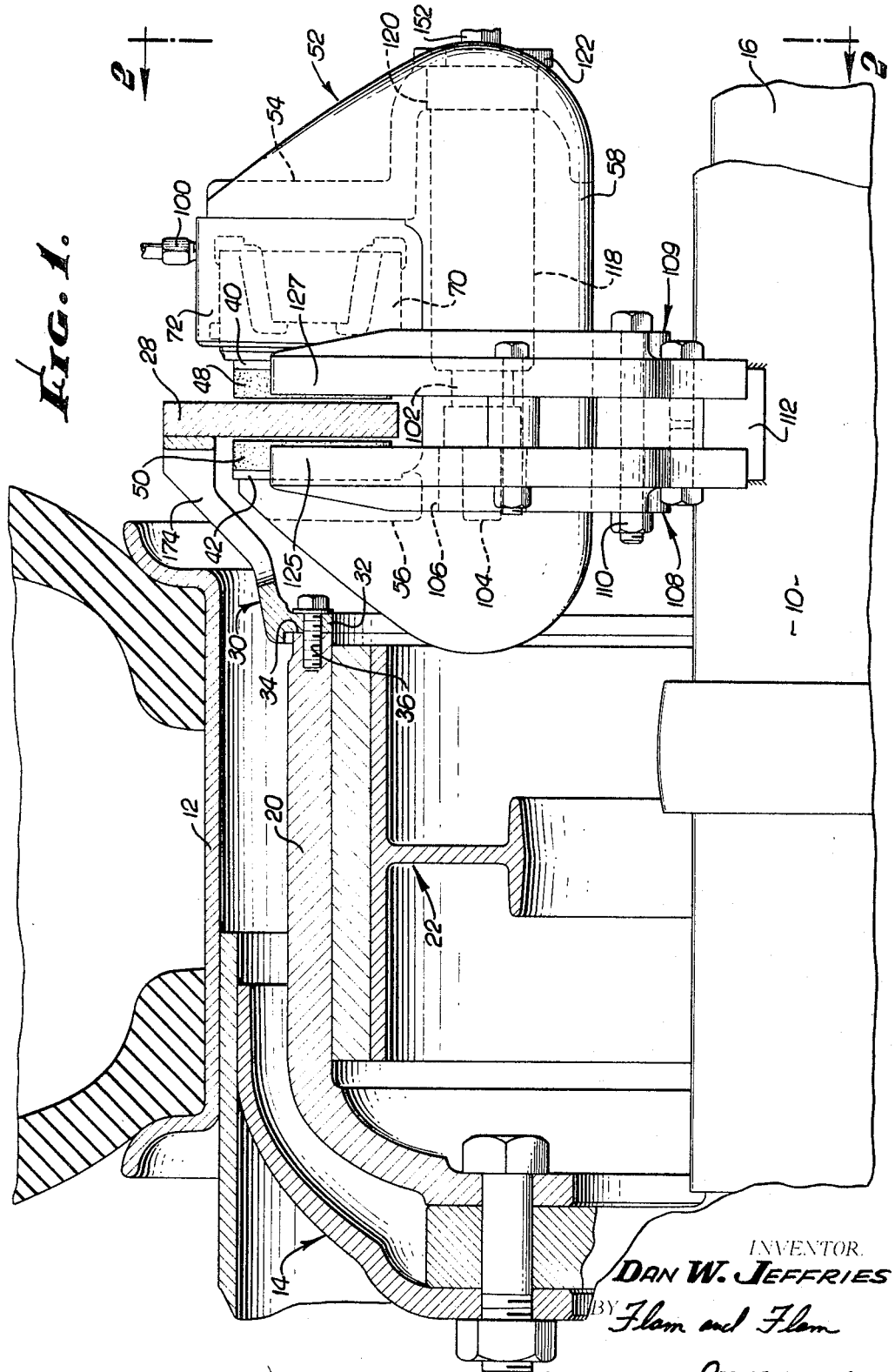
FIGURE 1 is an axial sectional view of a brake structure incorporating the present invention, some of the parts being shown in elvation.

The brake structure (FIGS. 1 to 9) is shown mounted on the rear axle or housing 10 of the truck. A wheel rim 12 is supported on a rotatable hub structure 14. The hub structure 14 is mounted upon the end of a power shaft 16 in turn supported by conventional bearing means in the axle. The right-hand end of the shaft 16 connects with the differential. The rim 12 has an outward extension 18 whereby two wheels may be coaxially supported for diversion of load, etc. Supported on and extending inwardly of the hub assembly 14 is a brake drum 20 that cooperates in a conventional manner with lined brake shoes 22.

In order to provide increased braking force, a supplemental disk brake structure 26 is provided. The brake structure 26 is designed to cooperate with a brake disk 28 supported by the inner or distal end of the brake drum 20. A web-like support 30 is provided for this purpose. The support 30 has a circular hub 32 fitting against the outer end surface 34 of the drum 20. The support flares outwardly to extend just inside the rim 12. A series of cap screws 36 secure the hub 32 in position. The disk 28 extends radially inwardly from the end of the support 30.

In order to exert a clamping pressure upon the disk 28, a pair of identical brake shoes 40 and 42 (FIG. 6) are provided that are located respectively on the inside and outside of the disk 28. The brake shoes 40 and 42 are formed as flat steel plates having circular apertures 44 and 46 by the aid of which they are mounted on the brake structure. The shoes 40 and 42 carry brake lining material 48 and 50 having suitable friction characteristics for engagement with the disk 28. The shoes 40 and 42 are mounted upon a clamp or caliper structure 52. The caliper structure is generally of double C-shape configuration with parallel or side-by-side sections joined together at their ends by jaws 54 and 56 respectively. The central connecting portions 58 and 59 (see also FIG. 5) extends through the central aperture of the disk 28. The jaw 56 forms the anvil. It provides a flat surface 60 opposed to the disk 28 and takes very little space on the outside of the disk adjacent the support 30. A post 62 is mounted in an aperture 64 of the anvil 56 so as to project inwardly a distance corresponding to the thickness of the shoe 42. The post 62 fits the aperture 46 of the shoe 42 to hold the shoe in position. A screw 66 holds the post 62 in proper adjusted position.

The companion shoe 40 on the inside of the disk 28 is mounted on a circular projection 68 of a cup-like piston 70. The flange of the piston 70 in turn fits within the bore 74 of the outwardly extending flange of a cup-like cylinder 72. An O-ring 76 is accommodated in an interior groove 78 at the end of the cylinder, providing an appropriate seal. The cylinder cup 72 and piston 70 form a fluid motor coupling between the brake shoe 40 and the caliper.

The cylinder cup 72 is held against the caliper jaw 54. A flat end surface 80 (FIG. 3) of the cylinder cup 72 abuts the surface 82 of the jaw 54. Furthermore, ears 84 and 86 of the cylinder cup 72 abut ears 88 and 90 of the jaw 54. Screws 92 and 94 together with nuts 96 and 98 attach the cylinder cup to the caliper.

In order to exert a clamping pressure on the disk 28, fluid under pressure is introduced into the cylinder cup 72. A fitting 100 (FIG. 6) is provided for this purpose.

Figure 6:
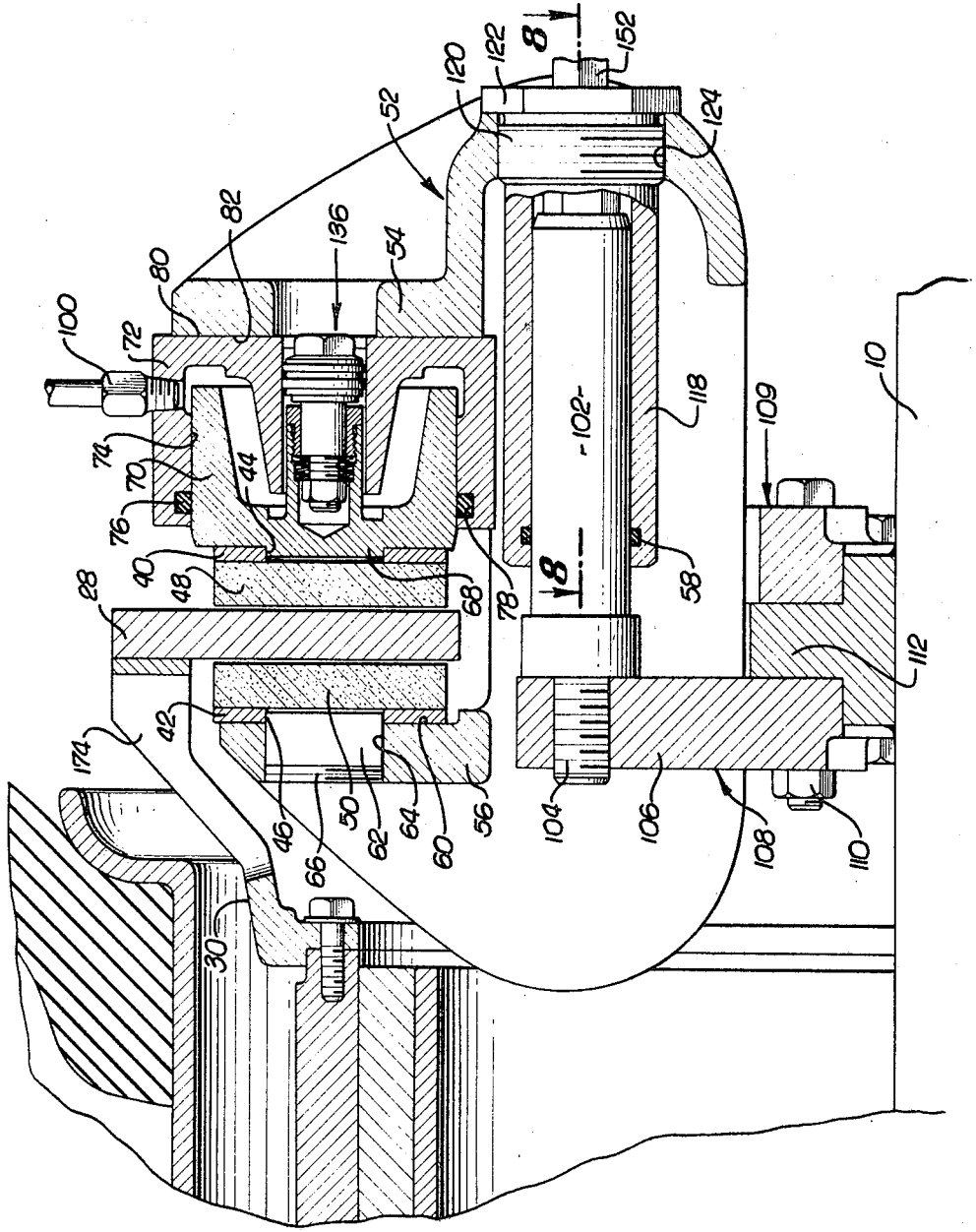
FIG. 6 is an enlarged fragmentary axial sectional view of the brake structure.

The caliper clamp 52 is supported on the axle 10 by the aid of a cylindrical mounting post 102 (FIGS. 5 and 6). The mounting post 102 extends alongside the axle 10 in parallel relationship thereto. The post 102 extends between the spaced central connecting portions 58 and 59 of the caliper. The post 102 has a reduced threaded end attached to a center post 106 of one of two torque resolving members 108 and 109. These torque resolving members (to be hereinafter described) have hubs attached by screws 110 to opposite sides of an arcuate flange 112 welded to the axle 10. The flange is located axially in alignment with the brake disk 28.

An elongated cylinder 118 (FIG. 6) is attached to the caliper 52 and extends between the connecting portions 58 and 59 to telescope over the post 102. One end of the cylinder has exterior threads 120 adjoining a radially enlarged hexagonal or other non-circular flange 122. The threads 120 of the cylinder 118 engage a threaded recess 124 formed on a web forming the parts of the caliper 52. The caliper accordingly is free to move axially by sliding movement on the post 102 and under the control of mechanisms hereinafter to be described. The cylinder 118 and post 102 thus form a fluid motor coupling between the caliper and the axle.

Figure 2:
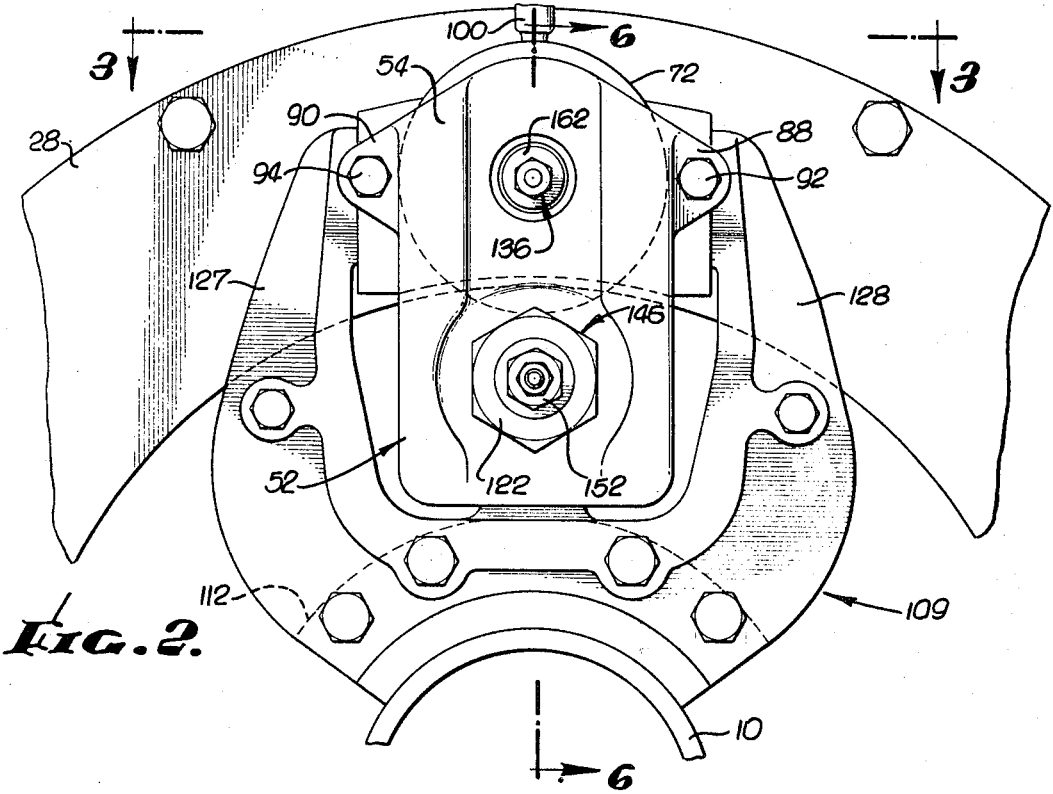
FIG. 2 is a fragmentary sectional view taken along the plane corresponding to line 2—2 of FIG. 1.
Figure 3:
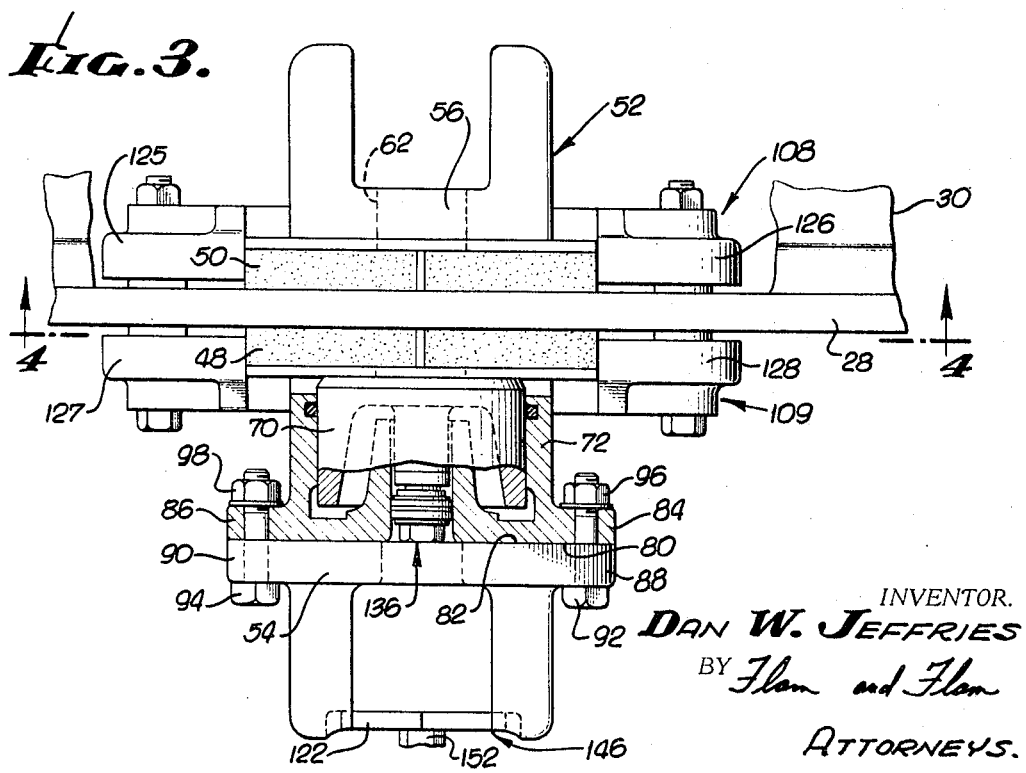
FIG. 3 is a top plan view taken in a direction corresponding to the plane indicated by line 3—3 of FIG. 2, a portion of the apparatus being broken away and shown in section.

The torque resolving members 108 and 109 transmit the braking torque to the axle 10. The torque resolving members cooperate respectively with the brake shoes (or their lining) on opposite sides of the disk 28. Except for the mounting post 106, the torque resolving members are identical. The torque resolving members 108 and 109 as shown in FIGS. 2 and 4, have arms 125, 126 and 127, 128 that extend radially outwardly in exterior encompassing relationship to the central connecting portions 58 and 59 of the caliper. The arms 125 and 126 of member 108, as shown in FIG. 4, have surfaces 129 and 130 positioned to engage the brake lining 50 upon angular movement of the lining in either direction. Accordingly, when a clamping force is exerted upon the disk 28, the torque resisting movement of the disk 28 is transferred directly to the axle 10 through an arm of the torque resolving member 108. The companion torque resolving member 109 (FIGS. 2 and 3) operates similarly with the lining 48 for the inside shoe 40.

The piston 70 and cup cylinder 72 are provided with a compensator device 136 similar to that shown and described in my prior patent, No. 3,338,354. As shown in FIG. 7, one part of the compensator device is attached at the end of a hollow stem 138 projecting inwardly from the central wall of the piston 70. The compensator has another part including a friction ring 140 that grips the cylindrical surface 142 formed in a tubular extension 144. The extension 144 projects inwardly from the bottom of the cylinder cup 72 and encompasses the stem 138. An O-ring 145 seals one end of the surface 142 and thus cooperates with the O-ring 76 (FIG. 1) to confine the pressurized fluid in the cylinder. Fluid pressure is communicated to the compensator 136 via the interior of the cylinder 72.

A similar compensator 146 is installed between the mounting post 102 and the cylinder 118. One part of the compensator, as shown in FIG. 8, is attached to the end of the mounting post 102, and another part of the compensator has a friction ring 148 that engages the interior surface 150 of the cylinder 118.

The compensators 146 and 136 are identical, except that the compensator 146 (FIG. 8) is provided with a fitting 152 by the aid of which fluid pressure may be communicated via an external conduit to the operative parts of the compensator 146. An O-ring 156 of the compensator 146 engages the interior cylinder surface 150 at one end. An O-ring 158 at the other end engages the post 102. The O-rings cooperate to confine the pressurized fluid.

The compensators 136 and 146 operate to maintain a pre-set clearance between the linings 48 and 50 on opposite sides of the brake disk 28. Reference is made to my said prior patent, No. 3,338,354, for an explanation of the operation of the individual compensators. Both compensators are simultaneously subjected to the fluid pressure source. In FIGS. 6, 7 and 8 the system is at zero fluid pressure and a normal clearance of say .010" exists on opposite sides of the disk. Upon application of pressure, the cylinder 118 is moved to the right as viewed in FIG. 8, and as a result of fluid acting over the area of the cylinder and piston, the rectractor spring 172 is collapsed, whereupon the lining 50 engages the disk 28. Simultaneously, the main piston 70 moves to the left as viewed in FIG. 7, collapsing the retractor spring 170, whereupon the lining 48 engages the disk 28. In order to achieve the appropriate clearance on both sides, the rectractor spring 170 of the compensator in the main piston is set to achieve the total nominal clearance, in this instance, .020" whereas the retractor spring 172 of the supplemental piston is set to achieve half of the total nominal clearance, namely .010".

After application of the brakes during which the friction rings 140 and 148 may move and during which the caliper may deflect, the fluid pressure ultimately drops to a small value at which the retractor springs overpower their pistons to establish the pre-set clearance.

No adjustments are required to obtain the appropriate brake clearances. It is merely necessary to install the compensators and the brake shoes. The brake shoes are easily installed or replaced by pushing the piston 70 rearwardly in the cylinder 74 and by pushing the caliper outwardly whereby space is provided on opposite sides of the disk 28. The shoes can then be slipped on or off the projections 62 and 68. In order to permit the piston and caliper to be so pushed, the friction rings 140 and 148 are released simply by loosening the nuts 162 and 160. The arms of the torque resolving member 109 (FIG. 2) do not encompass the shoes, and thus provide the requisite clearance for radial movement of the shoes into or out of position.

The compensators 136 and 146 are simply screwed in place. Thus the compensators have hex-headed mounting screws 176 and 178 (FIGS. 7 and 8) that are tightly screwed into the ends of the piston and stem 138 and the mounting post 102 respectively. The cylinders 72 and 118 are simply telescoped over the compensators. The compensators are factory adjusted to provide the desired clearance. Clearance is established simply by applying the brakes hard, whereupon the various parts move to proper adjusted position as more fully described in my said Patent No. 3,338,354.

In the claims, the word "brake shoe" means either the plate, the lining or both, and the word "axle" may mean either the actual wheel axle or an axle housing.

What is claimed is:

1. In a brake structure: a brake disk; a caliper having ends extending on opposite sides of the disk; a first brake shoe carried by one end of the caliper for engagement with one side of the disk; a second brake shoe for the other side of the disk; a first fluid motor coupling between the second brake shoe and the other end of said caliper movable upon actuation in a path for exerting a clamping pressure on said disk by said second brake shoe; a support for said caliper; a second fluid motor coupling between said support and said caliper movable upon actuation in a path to cause said first brake shoe to move towards said disk; and retractors for said fluid motors respectively for providing predetermined retracting movement of said fluid motor couplings to provide clearance on both sides of said brake disk.

2. The combination as set forth in claim 1 in which the retractor for said first fluid motor coupling provides substantially twice the retracting movement as that of said second fluid motor coupling whereby substantially equal clearance is restored on opposite sides.

3. The combination as set forth in claim 1 in which said fluid motor couplings are both located on the same side of said brake disk.

4. The combination as set forth in claim 1 in which said fluid motor couplings are both located on the same side of said brake disk and in substantially side by side relationship.

5. The combination as set forth in claim 1 together with arm means attached to said support and positioned to engage said brake shoes to by-pass said caliper in the transmission of braking torque to said support.

6. The combination as set forth in claim 1 in which the retractor for said first fluid motor coupling provides a retracting movement greater than that of said second fluid motor coupling whereby clearance is provided on opposite sides of said brake disk.

7. The combination as set forth in claim 1 together with means simultaneously applying fluid pressure to said fluid motor couplings.

8. The combination as set forth in claim 1 in which said support also rotatably supports a vehicle wheel, said brake disk being at least indirectly connected to said vehicle wheel.

9. The combination as set forth in claim 8 in which said fluid motor couplings are both located on the inside of said brake disk with said brake disk located between said wheel and said fluid motor couplings.

10. The combination as set forth in claim 9 together with a drum brake mechanism for said wheel including a brake drum mounting said brake disk at its distal end.

11. The combination as set forth in claim 1 in which said first fluid motor coupling includes members respectively attached or connected to said second brake shoe and said other end of said caliper, and said second fluid motor coupling includes members respectively attached to said support and said caliper.

12. The combination as set forth in claim 11 in which each retractor includes a part threadedly attached to one of the corresponding members, a part yieldingly frictionally gripping the other of the corresponding members, a pre-set limited lost motion connection between said parts including a retractor spring.

13. In a brake structure: a support; a wheel rotatably mounted on the support; a brake disk carried by the wheel; a caliper having a C- or U-shape configuration with a central connecting portion extending through the brake disk with its ends on opposite sides of the brake disk; a brake shoe carried by one end of the caliper and movable to exert a clamping pressure on said brake disk; a torque resolving member attached to the support and having an arm extending radially outwardly and beyond the said caliper connecting portion and positioned to engage the side of said brake shoe for transmitting braking torque to said support independently of said caliper; a second brake shoe carried at the other end of said caliper; a first fluid motor coupling between one of said brake shoes and the caliper for exerting a clamping pressure on said disk by said one brake shoe; a second fluid motor coupling between said caliper and said support for moving said caliper toward brake operating position; and retractors for said fluid motors respectively for providing predetemined retracting movement of said fluid motor couplings to provide clearance on both sides of said brake disk.

14. The combination as set forth in claim 13 in which said first fluid motor coupling provides a retracting movement greater than that of said second fluid motor coupling whereby clearance is provided on opposite sides of said brake disk.

15. The combination as set forth in claim 13 together with a drum brake mechanism for said wheel including a brake drum mounting said brake disk at its distal end.

16. The combination as set forth in claim 15 in which said fluid motor couplings are both located on that side of said brake disk remote from said brake drum.

17. In a brake structure: a support; a wheel assembly rotatably mounted on said support, including a brake drum having a hub attached to said wheel assembly; brake shoes mounted on said support for engagement with said brake drum; a brake disk carried by said wheel assembly and located adjacent the distal end of said brake drum beyond said brake shoes; a caliper having a connecting portion extending through said disk with one end positioned opposite the disk surface on the brake drum side, and with its other end positioned opposite the disk surface on the inside; means mounting the caliper on the support for limited axial movement; a first fluid motor having members secured respectively to said support and said caliper and located adjacent the said other end of said caliper for moving said caliper inwardly of said support; a retractor for said fluid motor providing a pre-set clearance between said one caliper end and said disk; a second fluid motor located radially beyond but alongside said first fluid motor and having one member connected to said caliper end and another member adapted to clamp said brake disk.

18. The combination as set forth in claim 17 in which said first fluid motor has a small displacement as compared to said second fluid motor.

19. In a brake structure: an axle; a wheel assembly rotatably mounted on said axle; a brake drum having a hub attached to said wheel assembly; a brake disk attached to the distal end of said brake drum; a pair of torque resolving members attached to said axle, one of said torque resolving members having angularly separated radially outwardly extending arms terminating on the drum side of said disk, and the other of said torque resolving members having angularly separated radially outwardly extending arms terminating on the opposite side or inside of said disk; said one of said torque resolving members having a cylindrical mounting post located at the base between its said arms and projecting in spaced parallel relationship to said axle toward the other of said torque resolving member; a substantially U-shaped or C-shaped caliper structure having a central connecting portion located angularly between the arms of said torque resolving members and through said brake disk with one end opposed to the said brake disk on the drum side thereof, and with its other end opposed to said brake disk on the opposite side or inside thereof with the arms of said torque resolving members respectively on opposite angular sides of said caliper ends; a supplemental cylinder carried by said caliper and located along its central connecting portion, said cylinder telescoping over said mounting post; a first brake shoe detachably fitted on the said one end of said caliper; a main cylinder attached to or forming a part of the other end of said caliper; a piston fitted in the cylinder; a second brake shoe detachably fitted on the said piston; said brake shoes being interposed between the arms of the torque resolving members respectively and operating to position said caliper by interfitting both the caliper and said torque resolving members; means for simultaneously admitting fluid under pressure respectively to said cylinders; and retractors for said fluid motors respectively for providing predetermined retracting movement of said caliper and said piston respectively to provide clearance on both sides of said brake disk.

20. The combination as set forth in claim 19 in which said brake shoes are provided with linings, the brake shoes having apertures fitting projections of said one caliper end and said piston respectively.

21. The combination as set forth in claim 19 in which said main cylinder has a projection telescoping over a stem of said piston, there being a rearwardly accessible opening at the base of said projection; said retractor for said piston and main cylinder comprising a part screw threadedly attached to the end of said piston stem, a part frictionally engaging the interior of said cylinder projection, an O-ring seal, a limited lost motion connection between the parts, and a retractor spring moving the parts to one limit of said lost motion connection; said retractor for said mounting and supplemental cylinder comprising a part screw threadedly attached to the end of said cylindrical mounting, a part frictionally engaging the interior of said supplemental cylinder and accessible at the end thereof, an O-ring seal, a limited lost motion connection between the parts, and a retractor spring moving the parts to one limit of said lost motion connection.

References Cited

UNITED STATES PATENTS

| | | | |
|---|---|---|---|
| 3,051,271 | 8/1962 | Spannagel et al. | 188—73 X |
| 3,249,181 | 5/1966 | Muller | 188—73 |
| 3,365,028 | 1/1968 | Hajek | 188—73 |
| 3,374,866 | 3/1968 | Miles | 188—73 |

GEORGE E. A. HALVOSA, *Primary Examiner.*

U.S. Cl. X.R.

188—106; 152